(12) United States Patent
Krithivasan et al.

(10) Patent No.: US 11,959,557 B2
(45) Date of Patent: Apr. 16, 2024

(54) PREVENTING DAMAGE TO VALVES DUE TO COLD WEATHER

(71) Applicant: Dresser, LLC, Houston, TX (US)

(72) Inventors: Rajesh Krithivasan, Jacksonville, FL (US); Richard John Klimas, Jr., Orange Park, FL (US); Jason Glen Knudson, Boerne, FL (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/900,456

(22) Filed: Aug. 31, 2022

(65) Prior Publication Data

US 2024/0068586 A1 Feb. 29, 2024

(51) Int. Cl.
*F16K 17/10* (2006.01)
*F16K 27/12* (2006.01)

(52) U.S. Cl.
CPC .............. *F16K 17/10* (2013.01); *F16K 27/12* (2013.01)

(58) Field of Classification Search
CPC ........ F16K 17/04; F16K 17/048; F16K 17/36; F16K 17/38; F16K 17/10; F16K 17/105; F16K 27/12
USPC ................ 137/488, 489.3, 489.5, 492, 492.5
See application file for complete search history.

(56) References Cited

U.S. PATENT DOCUMENTS

| | | | | |
|---|---|---|---|---|
| 2,870,781 A | * | 1/1959 | Tennis | F16K 17/105 137/489.5 |
| 2,998,020 A | * | 8/1961 | Charasse | F16K 17/105 251/29 |
| 3,160,332 A | * | 12/1964 | Brunson | F16K 17/10 222/73 |
| 3,211,174 A | * | 10/1965 | Weise | F16K 17/105 137/489 |
| 3,246,669 A | * | 4/1966 | Adams | F16K 17/10 137/489 |
| 3,389,796 A | * | 6/1968 | Fiala | F16K 17/10 251/282 |
| 3,412,753 A | * | 11/1968 | Baker | F16K 17/105 137/490 |
| 3,545,484 A | * | 12/1970 | Allen | F16K 17/105 137/490 |

(Continued)

OTHER PUBLICATIONS

Baker Hughes, "Consolidated 2900 Series Generation II Pilot-Operated Safety Relief Valves," (2022).

(Continued)

*Primary Examiner* — Kevin F Murphy
*Assistant Examiner* — Jonathan J Waddy
(74) *Attorney, Agent, or Firm* — Paul Frank + Collins P.C.

(57) ABSTRACT

An evacuation unit is configured to remove entrapped fluid from a flow control. These configurations may incorporate devices that can passively discharge fluid in response to loss of system pressure. These devices may use gravity or spring-assist as mechanisms to move fluid out of spaces in the device. This feature mitigates risks that the entrapped fluid freezes and expands, which can cause damage to metal components and lead to extensive downtime of process lines. As an added benefit, the features can reduce product costs or complexity because the proposed designs avoid the need for additional, peripheral "accessories," like pumps or heating elements, resident at the location of the flow control.

12 Claims, 6 Drawing Sheets

(56) References Cited

U.S. PATENT DOCUMENTS

| | | | | | |
|---|---|---|---|---|---|
| 3,754,566 | A | * | 8/1973 | Gemigniani | F16K 17/10 137/488 |
| 3,913,885 | A | * | 10/1975 | Greenwood | F16K 17/10 251/63 |
| 3,972,345 | A | * | 8/1976 | Court | F04B 49/24 137/490 |
| 4,017,053 | A | * | 4/1977 | Wells | F16K 17/10 251/63.4 |
| 4,565,349 | A | * | 1/1986 | Tomlin | F16K 17/048 251/63.4 |
| 4,716,927 | A | * | 1/1988 | Vayra | F16K 17/105 137/490 |
| 4,917,144 | A | * | 4/1990 | Giles | G05D 16/16 137/488 |
| 5,234,023 | A | * | 8/1993 | Lai | F16K 17/10 137/489 |
| 5,494,069 | A | * | 2/1996 | Bergmann | F16K 15/063 137/493.2 |
| 5,676,172 | A | * | 10/1997 | Mukumoto | F16K 17/10 137/489.5 |
| 6,209,523 | B1 | * | 4/2001 | Lehtonen | F02M 55/007 123/198 D |
| 2012/0167992 | A1 | * | 7/2012 | Krithivasan | F16K 17/003 137/2 |
| 2016/0091102 | A1 | * | 3/2016 | Neubauer | F16K 17/105 137/488 |
| 2020/0271236 | A1 | * | 8/2020 | Meshaikhis | F16K 37/0025 |
| 2021/0018943 | A1 | * | 1/2021 | Deng | F16K 31/1245 |

OTHER PUBLICATIONS

Baker Hughes, "Consolidated 3900 MPV Series MPV Pilot-Operated Safety Relief Valves," (2022).

* cited by examiner

PREVENTING DAMAGE TO VALVES DUE TO COLD WEATHER

BACKGROUND

Flow controls play a significant role in many industrial settings. Power plants and industrial process facilities, for example, use different types of flow controls to manage flow of material, typically fluids, throughout vast networks of pipes, tanks, generators, and other equipment. Safety relief valves are "fail-safe" devices that protect against rapid increases in pressure on the lines in these networks. Also known as "safety" valves, or "pressure relief" valves, these devices are necessary to avoid "overpressure" conditions that can cause damage to equipment or parts of facilities. A pilot-operated safety relief valve (POSRV) is a specific type of safety relief valve that uses system fluid, often under control of a fluid control module, to trigger operation as between its closed position or its open position.

SUMMARY

The subject matter of this disclosure relates to improvements to prevent damage in pilot-operated safety relief valves. Of particular interest are embodiments that can operate in cold weather conditions, for example, where ambient temperatures fall below the freezing point of material that flows through the device. These embodiments may evacuate or displace most of this material in response to loss of system pressure or like conditions that prevail in the event of planned or unplanned system shut-downs. This feature can prevent damage to the valve because it removes material that, if entrapped, can freeze and can expand inside the device, which can cause components to fracture or fail under load.

DRAWINGS

This specification refers to the following drawings.

Figure 1:
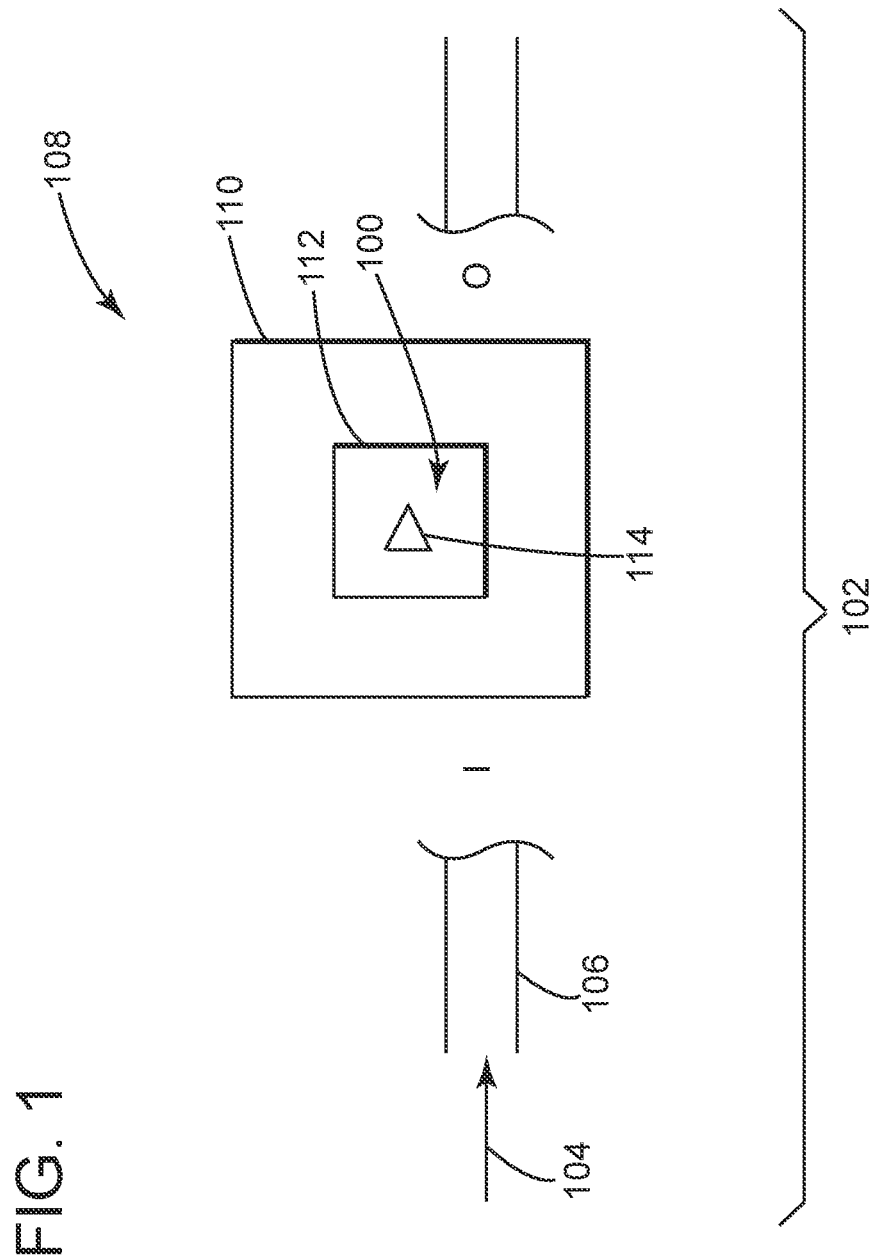
FIG. 1 depicts a schematic diagram of an exemplary embodiment of an evacuation unit.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the examples shown in drawings noted above. These features address risks to pilot-operated safety relief valves (or "POSRVs") that operate at ambient temperatures that fall below freezing temperature of fluids that become entrapped inside of the device. At these temperatures, the entrapped fluids can freeze and expand, leading to fracture or failure of mechanical components. The damage may require process downtime for repair. Operators may, in turn, need to employ regular maintenance or onboard mitigation measures that are costly or that require hardware (like heat tracing or pumps) that manufactures don't normally supply with POSRVs in the field. The proposed designs forego the need for these manual or "active" mitigation measures because they provide passive modalities to remove entrapped liquid before it freezes inside of the device. Other embodiments are within the scope of this disclosure.

FIG. 1 depicts an example of an evacuation unit 100. This example is found in a distribution network 102, typically designed to carry material 104 through a network of conduit 106. The network 102 may include a flow control 108 that has a valve body 110 to connect in-line with the conduit 106. The device may also have valve mechanics 112 to regulate flow through the valve body 110. In one implementation, the evacuation unit 100 may have a spring-assisted component 114 as well.

Broadly, the evacuation unit 100 may be configured to respond to loss of system pressure. These configurations may include parts that can passively evacuate fluid from the device. These parts may obviate the need for manual intervention, whether by technician or by mechanical device, like a pump or heated blanket. This feature can lower costs of ownership because operators do not need to intervene on production lines to remove entrapped fluid from the device.

The distribution system 102 may be configured to deliver or move resources. These configurations may embody vast infrastructure. Material 104 may comprise gases, liquids, solid0liquid mixes, or liquid-gas mixes, as well. The conduit 106 may include pipes or pipelines, often that connect to pumps, boilers, and the like. The pipes may also connect to tanks or reservoirs. In many facilities, this equipment forms complex networks.

The flow control 108 may be configured to release pressure in these complex networks. These configurations may include POSRVs and like devices. The valve body 110 is often made of cast or machined metals. This structure may form a flange at openings I, O. Adjacent pipes 106 may connect to these flanges. The valve mechanics 112 may be configured to protect against overpressure conditions. Suitable construction of components may create metal-to-metal seals, elastomer-to-metal seals, or elastomer-to-elastomer seals. This feature is beneficial to allow POSRVs to operate under extreme temperatures or pressure, as well as with caustic or hazardous materials.

The spring-assisted component 114 may be configured to integrate into the valve mechanics 112. These configurations may include devices that can generate a load. The devices may store energy, for example, as a result of deflection or like change in length or size. Springs may prevail for this purpose because they may compress or extend in response to changes in system pressure P. This response may, in turn, move residual or entrapped fluid out of the flow control 108. This arrangement forms a "passive" evacuation system that forecloses use of pumps or like "active" modalities to clear residual fluid from the device. It also avoids manual "interventions" from technicians.

Figure 2:
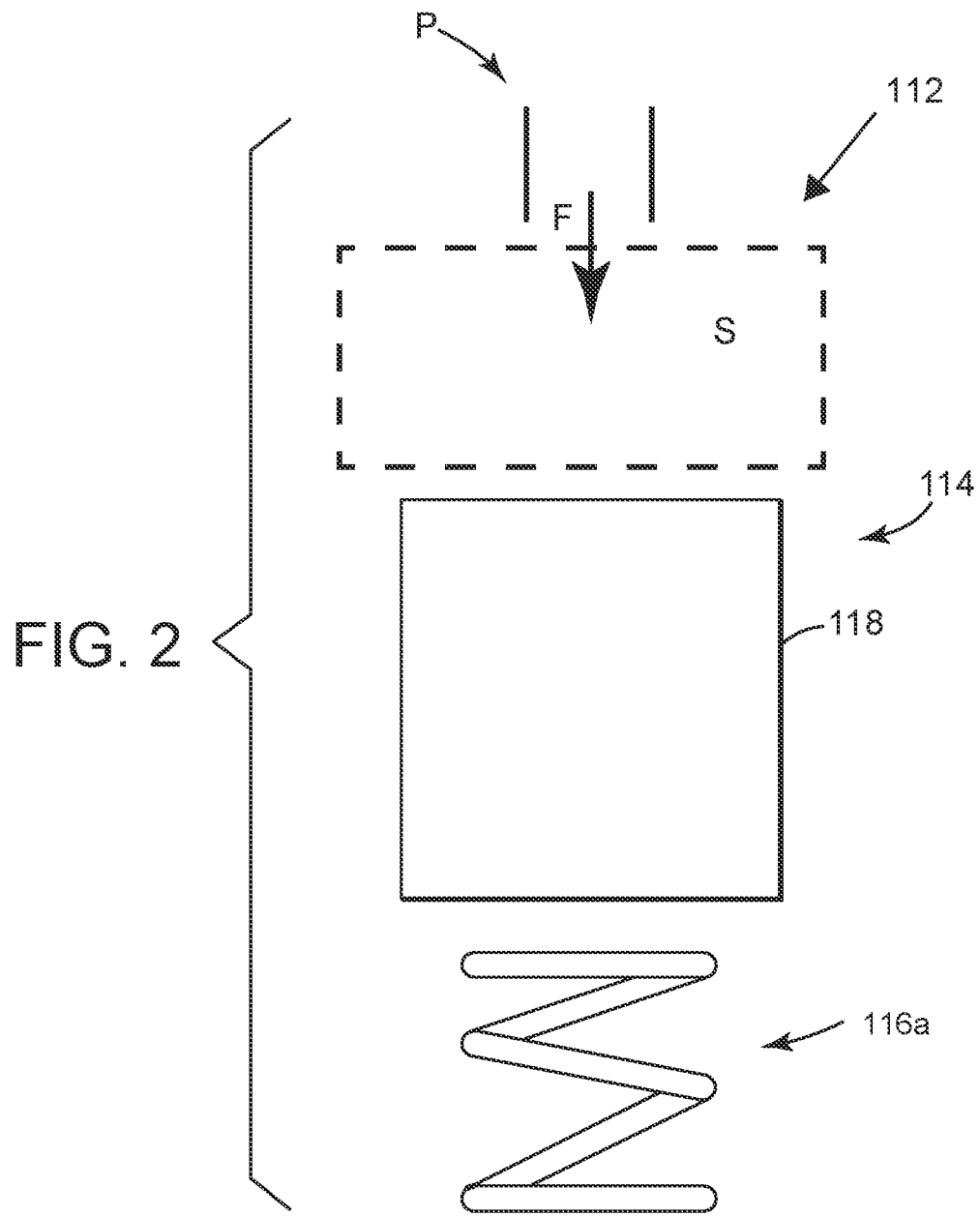
FIG. 2 depicts a schematic diagram of an example of the evacuation unit of FIG. 1.
Figure 3:
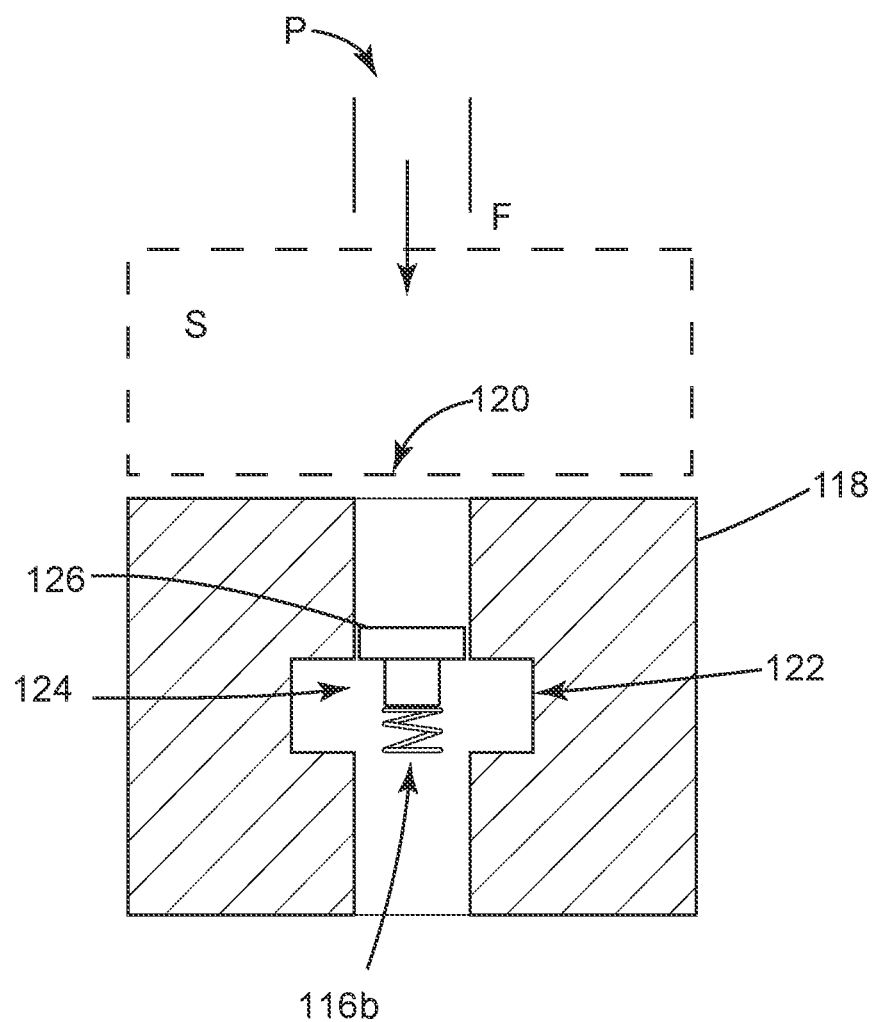
FIG. 3 depicts a schematic diagram of an example of the evacuation unit of FIG. 1.

FIGS. 2 and 3 depict an elevation view of the cross-section of exemplary structure for the valve mechanics 112 found in POSRVs. In FIG. 2, the spring-assisted component 114 may include a spring, for example, a coil spring or like resilient unit or member. The spring 116*a* may comprise material (and design) that satisfy use in POSRVs, particular under cold weather conditions. In one implementation, the spring 116*a* may reside on a bottom side (or "bottom") of a piston 118. The POSRV 108 may have a port P to receive fluid F into space S found above or on a top side (or "top") of the piston 118. Fluid F may generate a load or "system pressure" that act downwardly on the top of the piston 118. The spring 116*a* may compress or deflect under this load. Its design may take into consideration certain spring parameters, like stiffness or free length, to provide a maximum deflection and a pre-load. As best shown in FIG. 3, the piston 118 may include a bore 120 with a chamber 122. A spring 116*b* may form part of a valve 124, for example, with a poppet 126 that has at least a portion that resides in the chamber 122. In one implementation, the spring 116*b* may have coils with an inner diameter that allows them to circumscribe this portion, or at least part of the poppet 126, as desired.

As noted above, loss of system pressure P can trap fluid inside the device, for example in the space S. The springs 116*a* b are useful to evacuate this fluid. This feature prevents damage because the fluid does not have a chance to freeze and expand inside of the device. In FIG. 2, the spring 116*a* may generate a spring load. Its response to loss of system pressure P may direct the load upwardly against the bottom of the piston 118. The result is movement of the piston 118 that may displace or evacuate all, or most of, the fluid F from space S through the port P. In FIG. 3, system pressure P may maintain the valve 124 in its closed position to prevent flow through the bore 120. The spring load of the spring 116*b* may act upwardly against the poppet 126 in response to loss of system pressure P. The result is movement of the poppet 126 from its seated position to an open position, which changes the valve 124 to allow fluid from space S to drain through the bore 120 (around the poppet 126) out of the bottom of the piston 118.

Figure 4:
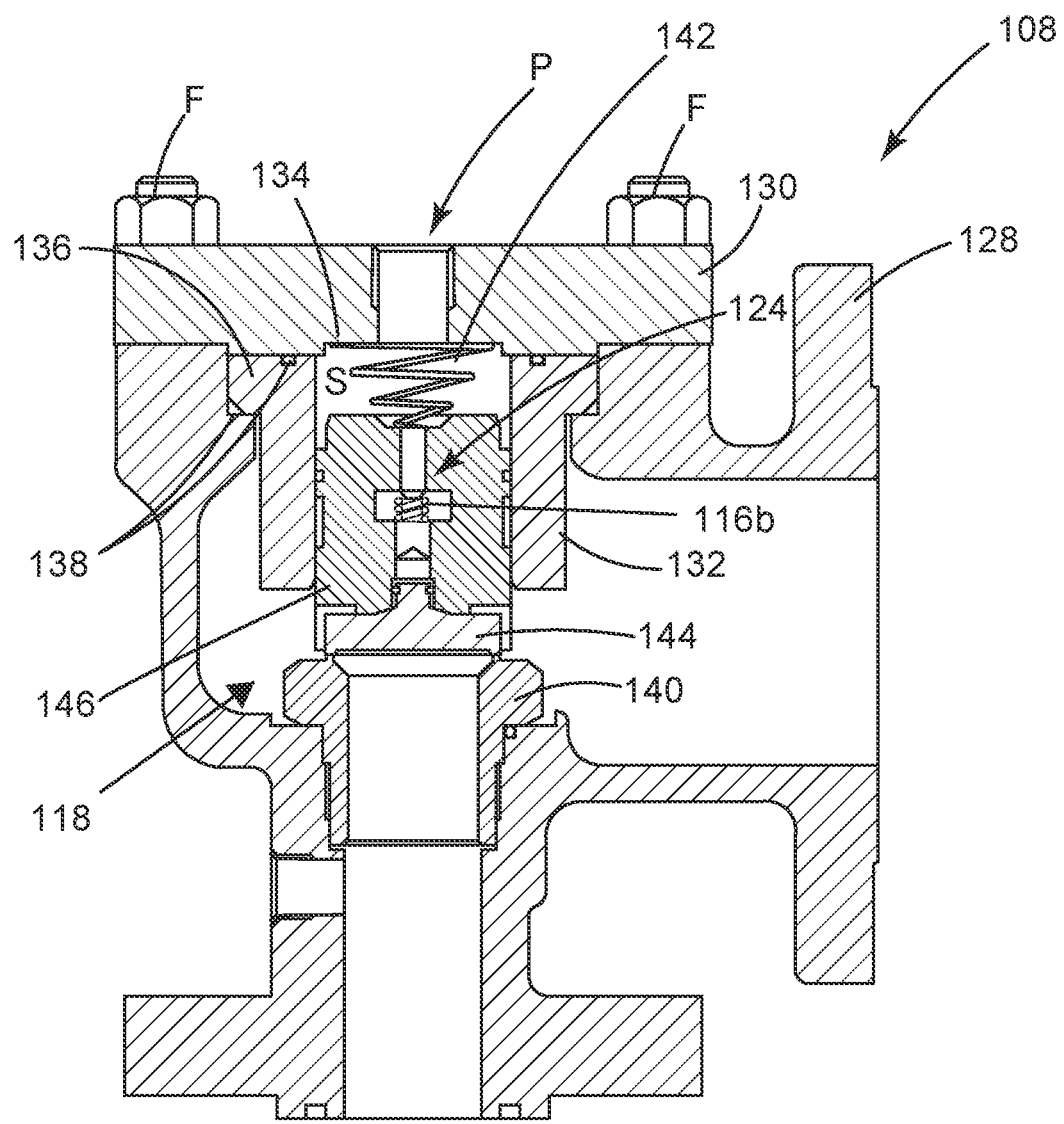
FIG. 4 depicts an example of a flow control that includes an example of the evacuation unit of FIG. 1.
Figure 5:
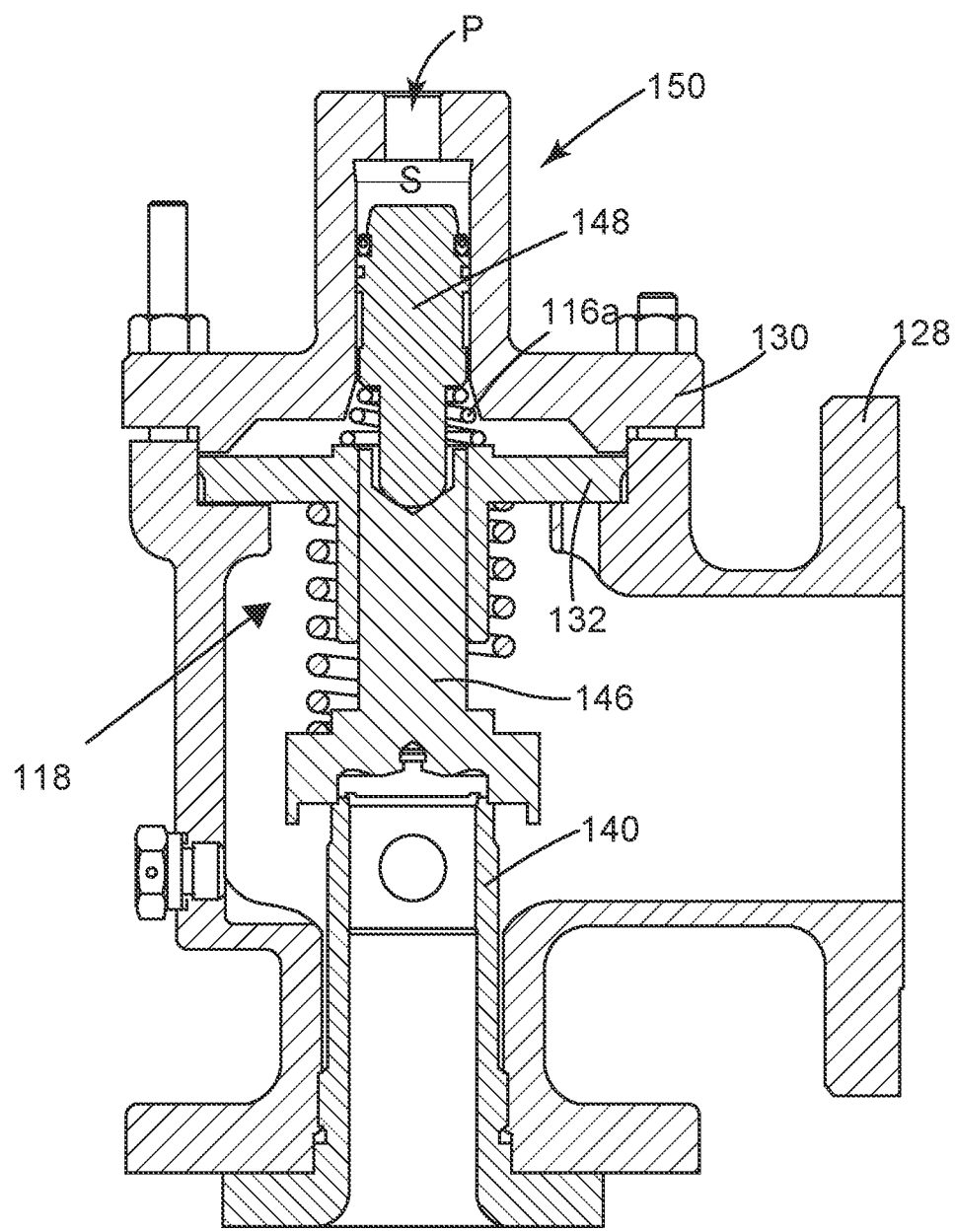
FIG. 5 depicts an example of a flow control that includes an example of the evacuation unit of FIG. 1.

FIGS. 4 and 5 depict an elevation view of the cross-section of exemplary structure for the flow control 108. In FIG. 4, the structure may include a base 128 with a coverplate 130. The port P may reside in the coverplate 130. The device may also have a guide 132 with a central bore 134 and a shoulder 136 that contacts both the base 128 and the coverplate 130. Seals 138 may ensure pressure-tight assembly using fasteners F, like nuts and bolts. A nozzle 140 may insert into a lower part of the base 128. A spring 142 may reside in the space S between the coverplate 130 and the piston 118. In one implementation, the piston 118 may include a disc 144 that couples with a first part 146 that resides in the central bore 134 of the guide 132. The first part 146 may hold the disc 144 proximate the nozzle 140. The spring 116*b* may reside (as part of the valve 124) in the first part 146, as well. As best shown in FIG. 5, the piston 118 may include a second part 148 that resides in a domed portion 150, which may couple with the coverplate 130 either as a separate piece or formed unitarily therewith. In one implementation, the spring 116*a* interposes between the second part 148 and the guide 132. The bottom of the second part 148 may have a groove or notch, as necessary, to accommodate or receive part of the spring 116*a*. Coils of the spring 116*a* may circumscribe the second part 148, as well.

Figure 6:
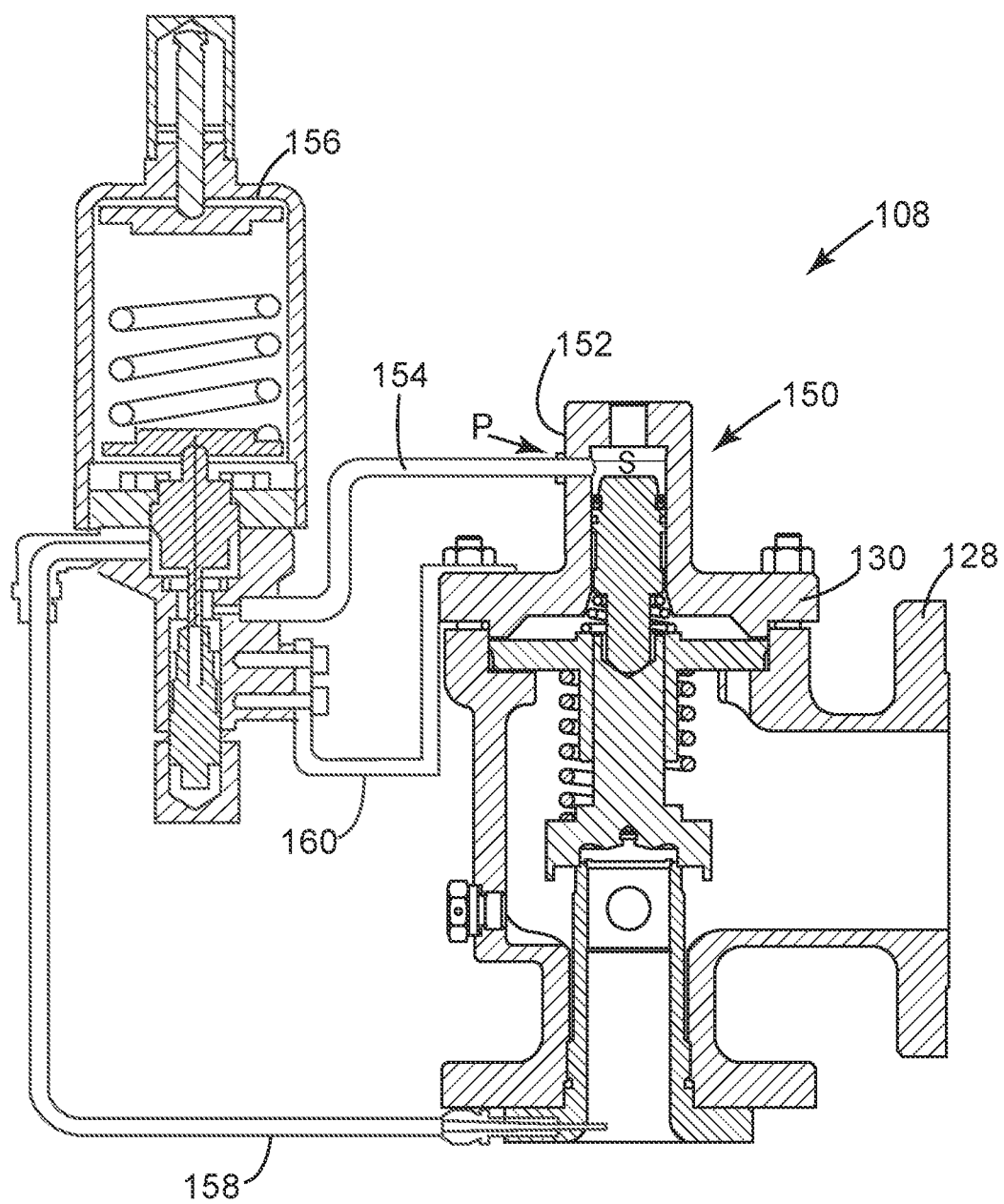
FIG. 6 depicts an example of a flow control.

FIG. 6 depicts an elevation view of the cross-section of the structure for the flow control 108. The port P may reside on a side 152 of the domed section 150. Placement of the port P here can allow fluid in space S to drain back into conduit 154 that connects a pilot 156 with the piston 118. Conduit 158 can also connect the pilot 156 with the lower portion of the base 128. In one implementation, a bracket 160 may have geometry to facilitate gravity feed of the entrapped fluid in response to loss of system pressure.

In view of the foregoing, the improvements herein reduce risks of damage to POSRVs at cold temperatures. The improvements rely almost entirely on availability of system pressure at the safety valve. When system pressure is absent, the embodiments react to remove as much trapped fluid as possible from the POSRV. This feature, however, does not operate under power or require manual intervention. The "passive" actions of the proposed design instead offer operators with a simple solution that avoids unnecessary costs, whether added complexity due to use of additional parts (e.g., pumps) or additional labor (e.g., scheduled maintenance).

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A pilot-operated safety relief valve, comprising:
    a valve body with flanged openings for connecting to pipes;
    a coverplate coupled to the valve body so as to enclose a space inside of the valve body;
    a port, separate from the flanged openings, which is coupled with the space;
    a moveable piston disposed in the space and moveable along a movement axis, the moveable piston having a first part and a second part stacked on the first part and separable from the first part;
    a guide having a central bore that receives the first part of the moveable piston;
    a first spring having a first end and a second end, the first end of the first spring in contact with a surface of the second part of the moveable piston and the second end of the first spring in contact with the guide;
    a second spring having a first end and a second end, the first end of the second spring in contact with a surface of the first part of the moveable piston and the second end of the second spring in contact with the guide; and
    a pilot valve coupled with the port,
    wherein the first spring generates a load in response to a decrease in pressure in the space that causes the second part to move to evacuate fluid from the space into the port.

2. The pilot-operated safety relief valve of claim 1, wherein the first spring comprises a coil spring.

3. The pilot-operated safety relief valve of claim 1, wherein the first spring comprises a coil spring that circumscribes at least part of the second part of the moveable piston.

4. The pilot-operated safety relief valve of claim 1, wherein the second spring comprises a coil spring.

5. The pilot-operated safety relief valve of claim 1, wherein the first spring and the second spring each comprise a coil spring.

6. A pilot-operated safety relief valve, comprising:
a valve body with flanged openings for connecting to pipes;
a coverplate disposed on the valve body, the coverplate having a port and a surface forming an upper boundary of a space coupled with the port;
a guide disposed in the valve body, the guide having a central bore;
a two-part moveable piston disposed in the valve body and moveable along a movement axis, the two-part moveable piston having a first part that resides in the guide and a second part stacked on the first part, the second part having a top and a bottom, the top forming a lower boundary of the space;
a first spring having a first end and a second end, the first end of the first spring in contact with the bottom of the second part and the second end of the first spring in contact with the guide;
a second spring having a first end and a second end, the first end of the second spring in contact with a surface of the first part of the moveable piston and the second end of the second spring in contact with the guide; and
a pilot valve coupled with the port,
wherein the first spring is configured to act on the bottom of the second part to reduce fluid volume in the space in response to loss of fluid pressure that flows through the port.

7. The pilot-operated safety relief valve of claim 6, wherein the first spring comprises a coil spring.

8. The pilot-operated safety relief valve of claim 6, wherein the first spring generates a load that causes the second part of the two-part piston to move toward the port.

9. The pilot-operated safety relief valve of claim 6, wherein the second part of the two-part piston resides in a domed section of the coverplate.

10. The pilot-operated safety relief valve of claim 6, wherein the port resides in a domed section of the coverplate.

11. The pilot-operated safety relief valve of claim 6, wherein the second spring comprises a coil spring.

12. The pilot-operated safety relief valve of claim 6, wherein the first spring and the second spring each comprise a coil spring.

\* \* \* \* \*